(12) United States Patent
Storz

(10) Patent No.: US 8,347,397 B2
(45) Date of Patent: Jan. 1, 2013

(54) METHOD TO RESTORE A FAILED HDD OF A PVR

(75) Inventor: Achim Storz, Triberg (DE)

(73) Assignee: Thomson Licensing, Issy-les-Moulineaux (FR)

( * ) Notice: Subject to any disclaimer, the term of this patent is extended or adjusted under 35 U.S.C. 154(b) by 467 days.

(21) Appl. No.: 12/448,507

(22) PCT Filed: Dec. 17, 2007

(86) PCT No.: PCT/EP2007/064087
§ 371 (c)(1),
(2), (4) Date: Jun. 23, 2009

(87) PCT Pub. No.: WO2008/080818
PCT Pub. Date: Jul. 10, 2008

(65) Prior Publication Data
US 2010/0131771 A1    May 27, 2010

(30) Foreign Application Priority Data

Dec. 28, 2006 (EP) .................................. 06127295

(51) Int. Cl.
*G06F 17/30* (2006.01)
*G06F 11/14* (2006.01)
*G06F 11/30* (2006.01)

(52) U.S. Cl. ............ 726/26; 707/640; 714/6.3; 713/193

(58) Field of Classification Search ...................... 726/26
See application file for complete search history.

(56) References Cited

U.S. PATENT DOCUMENTS

| 6,366,987 B1 | 4/2002 | Tzelnic et al. | |
| 6,901,493 B1 * | 5/2005 | Maffezzoni | 711/162 |
| 7,921,258 B1 * | 4/2011 | Panabaker | 711/126 |
| 2002/0114612 A1 | 8/2002 | Hayashi | |
| 2003/0028765 A1 * | 2/2003 | Cromer et al. | 713/164 |
| 2005/0063674 A1 | 3/2005 | Bilinski et al. | |
| 2007/0133953 A1 * | 6/2007 | Fontijn et al. | 386/126 |

FOREIGN PATENT DOCUMENTS

| EP | 1431979 | 6/2004 |
| WO | WO 2005/029852 | 3/2005 |

OTHER PUBLICATIONS

Search Report Dated Feb. 18, 2008.

* cited by examiner

*Primary Examiner* — Matthew Henning
(74) *Attorney, Agent, or Firm* — Myers Wolin, LLC

(57) ABSTRACT

The invention relates to recovering files stored on a HDD of a Personal Video Recorder (PVR) in the case of a crash of the HDD. Every time a file is stored on an external medium special information of the file system of the HDD is stored—optionally in encrypted form—on the medium as far as enough storage capacities available there. According to the invention the stored information is overwritten if a rewritable medium is used. By that the medium can be optimally used. If the HDD fails the stored information can be used to copy the files to external media.

4 Claims, No Drawings

METHOD TO RESTORE A FAILED HDD OF A PVR

This application claims the benefit, under 35 U.S.C. §365 of International Application PCT/EP2007/064087, filed Dec. 17, 2007, which was published in accordance with PCT Article 21(2) on Jul. 10, 2008 in English and which claims the benefit of European patent application No. 06127295.1, filed Dec. 28, 2006.

The present invention relates to a method of operation for a Personal Video Recorder (PVR), especially when storing data on a rewritable DVD.

A modern PVR comprises a permanent hard disc drive (HDD), which is used for storing and recording data of for example videos or photos. The capacity of the HDD normally is great and amounts to more than 100 GB, thus allowing to store many videos and/or photos or other data. The HDD is installed within a housing of the PVR. The PVR also comprises means for reading from and writing on external media such as flash memories and optical discs.

A problem arises when the HDD fails, as the data cannot be recorded then.

To avoid this it is known to store complete files on external storage media such as writable DVD-R, rewritable DVD-RW and/or flash-memories. However this needs many media to store on and to be stored (e.g. on a board or in a cupboard).

In the case of a failure of the HDD often only a file system of the HDD is destroyed. So an other method to avoid loss of data is to store a backup of the file system on a second location of the HDD. However this location may also be destroyed in the case of a failure of the HDD.

WO 2005/029852 A1 describes a method of operation for a content item recorder such as a PVR having storage means, where the method comprises generating reduced reference information associated with the plurality of content items and storing that information to a back-up memory separate from the storage means. The storage means is preferably a HDD of a high storage capacity. The back-up memory may be an optical disc or a flash memory. The reduced reference information comprises information to be able to address to the content data of the HDD from other means. By that a back-up of all or of most of the items can be initialised in the case of a failure of the HDD. But when storing items on a rewritable storage medium the information is stored for several times on the storage medium, by that occupying storage place that cannot be used for storing items.

SUMMARY OF THE INVENTION

The object of the present invention is to provide a method of operation for a Personal Video Recorder (PVR), where necessary information to enable a back-up of data stored on a HDD is generated and stored on a rewritable medium, and where the medium is released from unnecessary data.

According to the invention there is provided a method of operation for a Personal Video Recorder (PVR), where additional steps for storing current information are implemented: checking if the external storage media is rewritable, if yes not marking the information to be stored in a second file system of the external storage media, if an additional file has to be stored, overwriting the stored information and if there is enough place, storing the current information after the additional file and using the latest stored information to restore the HDD storage means when failed. The solution relies on the fact, that the information stored on the external rewritable storage media is not needed as soon as the current information is stored. On the other hand that stored information demands storage capacity on the external storage media which cannot be used to store new data. By always not marking the information to be stored in the second file system, this information can easily be overwritten as soon as new data have to be stored. If there is enough storage capacity, the current information is stored at the end of the last file. By that the storage capacity of a rewritable medium can be used optimally, especially when several files have to be stored at different times. The storing of the information is done automatically without any additional action of the user (that means the user has only to act for storing a file). The user even does not recognise the storing of the information.

Preferably the current information contains a directory or a file structure and a fragmentation table for every file of the HDD storage means. By that the most relevant information for recovering data from a destroyed HDD are available without using excessive storage capacity.

The external storage media is a rewritable optical disc, preferably a DVD-+RW disc. This disc is safe enough against failure and provides a relative great storage capacity.

When the current information about HDD content is being written to external storage, and when the external storage is transferred to another user, the current information may be visible to the other user, which may or may not be acceptable to the first user. Advantageously, in the step of storing the current information, the current information is stored in encrypted form using an encryption key specific to the individual Personal Video Recorder, and wherein in the step of using the latest stored information, the information is decrypted using a decryption key corresponding to the encryption key. in that way, it is ensured, that the current information can only be used on the same PVR where it was generated, hence providing data privacy if so desired.

DETAILED DESCRIPTION OF A PREFERRED EMBODIMENT

Further features and advantages of the present invention will become apparent from the subsequent description of its preferred embodiments.

A Personal Video Recorder (PVR) comprises a receiver for receiving data from an external source like a TV transmitter, a hard disc drive (HDD), means for reading from/writing on external media and a processor for processing data. The processor is coupled to the receiver, the HDD and the means for reading/writing.

The HDD is a storage media of a high storage capacity, preferably of more than 100 GB, on which files (records), e.g. video films, photos and/or music, are stored in the form of digitised data. For every single file special data are stored in a file system on the HDD. When the HDD is destroyed often only the file system is concerned. As a consequence those files can be recovered, of which the special data are available. For this reason it is useful to store the special data or information of all files on a medium different from the HDD.

The information is identical with an essential part of the file system of the HDD and contains a directory or a file structure and a fragmentation table for every file of the HDD storage means.

The means for reading from/writing on external media comprise at least one reader/writer for CDs and DVDs and one for flash memories.

The processor is connected to the HDD, to the receiver, to the readers/writers and to other known equipment which is necessary or useful for the PVR. The processor organises all input and output data of the PVR, eventually via one or more subprocessors.

The PVR-hardware is well known in the art and commonly available in the market.

The method is described as follows:

A user decides on which storage medium a file has to be stored. By that after a time of use a number of files has been stored on the HDD and a respective file system is created and stored on the HDD.

If the user decides to store one or more files on a new external medium, he inserts the medium into the respective means of the PVR. The processor checks first whether the inserted medium is rewritable and second whether the file system of the HDD has been changed since the last time the information had been stored on an external medium. If the second check is positive (that means that the file system has been changed) the processor prepares to store the current information on the medium.

The file(s) is (are) stored on the medium. After storing the processor checks if there is enough capacity to store the information after the file. If yes the current information is stored on the medium without knowledge of the user.

If the first check is positive the current information is not marked in the file system of the medium.

If the user decides to store one or more files on an external medium, on which at least one file and information is already stored, he inserts the medium into the respective means of the PVR. The processor checks whether the inserted medium is rewritable and whether the file system of the HDD has been changed since the last time the information had been stored on an external medium. If both checks are positive the processor prepares to store the current information on the medium.

Then the information is overwritten by the new file(s). For this the information stored on the medium is deleted after the preparation of the current information or at the same time. After storing the new file(s) after the existing file the processor checks if there is enough capacity to store the information after the file. If yes the current information is stored on the medium without knowledge of the user.

The current information is not marked in the file system of the medium.

Every time a file and/or an information is stored on a medium the processor stores a number of that medium in a permanent memory of the PVR. This memory is called disc library, by which the user is informed about the contents of his media.

The disc library also knows the medium on which information has been stored latest.

In the case of failure of the HDD the PVR will ask the user to insert the medium with the latest information, indicating to the user the respective number of the medium. As soon as inserted the processor will read the information and try to recover the files stored on the HDD. If the files can be recovered—complete or in part—the PVR will ask the user to copy the respective files on external media, preferable such as (re)writable DVDs or—if the PVR has a respective attachment—an external HDD.

Of course those movies cannot be recovered, which were stored after the latest information has been stored.

The method of the invention is stored in form of a computer program in the permanent memory of the PVR.

The invention claimed is:

1. A method of operation for a Personal Video Recorder having a stationary memory and an external memory of rewritable type, the method comprising:

generating, after a new content item has been recorded on the stationary memory, an up-to-date file system information about the content items on the stationary memory, storing the up-to-date file system information on the stationary memory, storing, in case there is enough unused memory capacity on the external memory, a copy of the up-to-date file system information on the external memory, and using, in case the up-to-date file system information on the stationary memory is destroyed, the copy of the up-to-date file system information from the external memory to restore the stationary memory;

wherein the storing a copy of the up-to-date file system information comprises writing the copy of the up-to-date file system information to the external memory at a position at the beginning of the unused memory capacity thereof, and not marking the copy of the up-to-date file system information into a second file system of the external memory, such that the copy of the up-to-date file system information gets overwritten whenever a new content item is being recorded on the external memory.

2. The method according to claim 1, wherein the up-to-date file system information contains a directory or a file structure and a fragmentation table for every file of the stationary memory.

3. The method according to claim 1, wherein the external memory is a rewritable optical disc.

4. The method of claim 1, wherein the storing the up-to-date file system information comprises encrypting the up-to-date file system information with an encryption key specific to the individual Personal Video Recorder, and wherein the using the copy of the up-to-date file system information comprises decrypting the up-to-date file system information with a decryption key corresponding to the encryption key.

* * * * *